Figure 1:
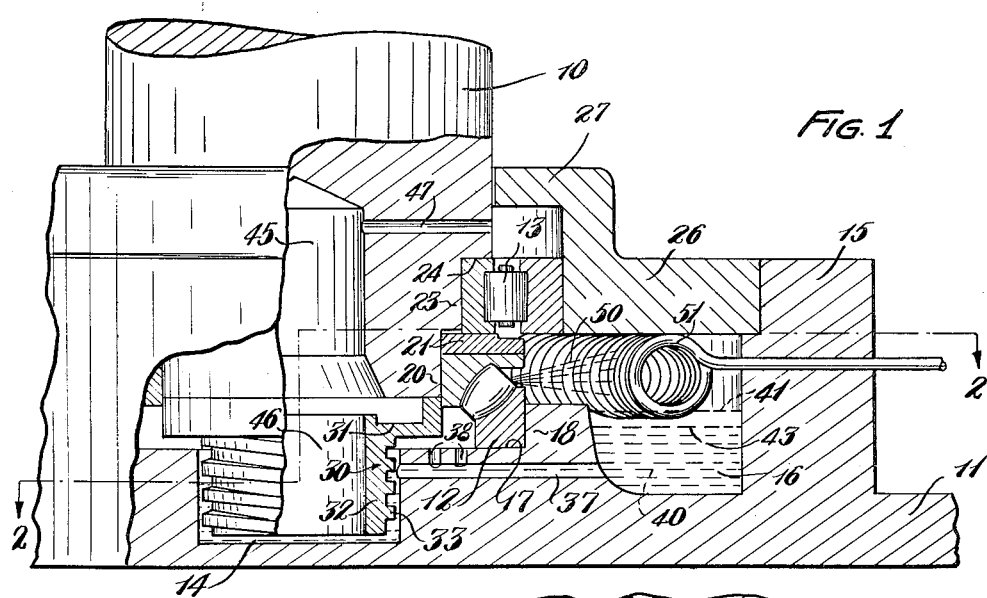

Jan. 4, 1955  E. J. KACZOR  2,698,773

LUBRICANT COOLING SYSTEM

Filed March 17, 1951

INVENTOR.
EDWARD J. KACZOR
BY
Alfred C. Body
ATTORNEY

United States Patent Office 2,698,773
Patented Jan. 4, 1955

2,698,773

LUBRICANT COOLING SYSTEM

Edward J. Kaczor, Cleveland, Ohio, assignor to The Ohio Crankshaft Company

Application March 17, 1951, Serial No. 216,203

6 Claims. (Cl. 308—172)

This invention pertains to the art of lubrication and, more particularly, to a lubricant-cooling arrangement for apparatus having a shaft rotating on a vertical axis.

The invention is particularly adapted to the cooling of the lubricant or oil of the lower thrust bearing of vertical-shafted high-frequency motor generators and will be described with particular reference to such equipment, although it will be appreciated that it has broader applications.

In such equipment, the high speed of rotation and the heavy weight of the rotor require a continuous supply of lubricant for the bearings generally of an extremely high viscosity. A considerable amount of heat is generated in the bearing supporting the rotor and the oil flowing through the bearing is utilized not only for lubrication but as a medium for conducting the heat away from the bearing. Heretofore, it has been conventional to draw oil from a sump, flow it through the bearing and discharge it back into the sump. A cooler was submerged in the sump through which a refrigerant, such as water, was continuously circulated to cool the oil.

I have found that, particularly when high-viscosity oils are employed for the lubrication of the bearing, the oil tends to congeal and form an insulating blanket on the surfaces of the cooler, radically lowering the efficiency of the cooler. In some instances, it has been impossible to obtain the required amount of cooling because of the insulating effect of the congealed oil on the cooling surfaces.

The present invention contemplates a new and improved arrangement of an oil cooler in equipment of the type referred to which overcomes all of the above difficulties and enables a maximum efficiency of cooling with a minimum-size cooler.

In accordance with the present invention, slinger means rotating with the shaft are provided above the sump level which sling the oil discharged from the bearing radially outwardly at high velocity and the oil cooler, instead of being submerged below the level of the oil in the sump, is placed at least in part above the level of this oil and in the direct discharge path of the oil from the slinger means. The slinger means may be inherent in the bearing or may be a separate member fastened to the shaft and rotating therewith. With such an arrangement, I have found that the velocity of the oil leaving the slinger means is sufficient to break off any oil which may have congealed on the cooler means simply by the force of the impact of the oil on the cooling surfaces. While any type of cooling means may be employed, I have found that a toroidal coil of copper tubing through which water or other refrigerant may be continuously circulated provides a very satisfactory cooling means. A toroidal coil may be positioned coaxial with the axis of rotation whereby all of the oil thrown radially outwardly by the slinger means may impinge on this cooling means and, having been cooled, flow back into the sump.

The principal object of the invention is the provision of a new and improved arrangement of an oil cooler which is simple in construction, economical to manufacture, gives a maximum of cooling with a minimum of cooling surface and which is not troubled with the difficulty of congealed oil serving as an insulating layer on the cooling surfaces and preventing an efficient transfer of heat from the oil to the cooling means.

Another object of the invention is the provision of new and improved means for cooling the lubricating oil for a bearing supporting a shaft rotating on a vertical axis, which means includes slinger means rotating with the shaft located above the level of the oil in the oil sump for throwing oil radially outwardly at high velocity and cooling means positioned also above the level of the oil in the oil sump and directly in the discharge path from the slinger means.

Other and more specific objects will appear upon a reading and understanding of the preferred embodiment of the invention described in this specification.

The invention will be specifically set forth and defined in the claims appended hereto.

Figure 2:
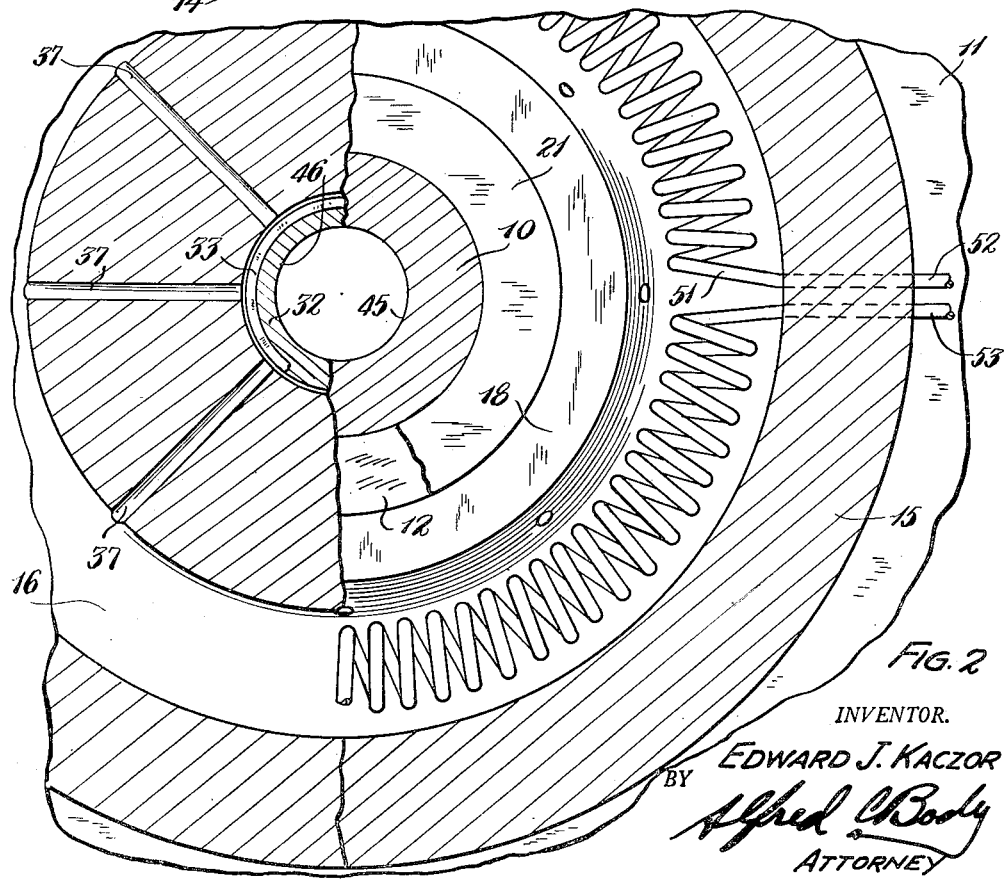

The invention may take physical form in a number of different arrangements and combinations of parts and a preferred embodiment of one of such arrangements will be described in detail in this specification and illustrated in the accompanying drawing which is a part hereof; and wherein, Figure 1 is a fragmentary side sectional view of the lower end of a high-frequency motor-generator unit showing a lubricant cooling arrangement embodying the present invention and Figure 2 is a top sectional view of Figure 1 taken approximately on the line 2—2 thereof.

Referring now to the drawings which are only for the purposes of illustrating the invention and not for the purposes of limiting it, Figure 1 shows a vertically extending shaft 10 journalled for rotation on a base 11 by a pair of bearings 12 and 13. The bearing 12 is for the purpose of supporting the vertical weight of the shaft while the bearing 13 is for the purpose of supporting the shaft against radial movements and loads.

The base 11 may be of any convenient construction but is generally and preferably a casting machined to the required dimensions and includes, generally, a central cylindrical well or bore 14 coaxial with the axis of rotation of the shaft 10; an upstanding cylindrical flange 15 spaced a considerable distance from the axis of rotation to form an oil sump or reservoir 16 within the base itself and a flat surface 17 intermediate the well 14 and the flange 15 on which the lower side of the outer race of the bearing 12 rests and is confined against radial movement by an upstanding cylindrical shoulder 18. The inner race of the bearing 12 fits snugly around a portion 20 of reduced diameter on the shaft 10 and has, bearing on its upper surface, a flat, washer-like member 21, on the upper surface of which, in turn, the lower side of the inner race of the bearing 13 rests. The shaft 10 is reduced in diameter, as at 23, to fit snugly inside of the inner race of the bearing 13 and has a shoulder 24 which bears on the upper surface of this inner race. The outer race of the upper bearings 13 fits into the opening of a ring-like member 26 which, in turn, fits into the upstanding cylindrical flange 15, thus transmitting radial forces of the shaft 10 to the base 11. The ring member 26 has an upstanding portion 27 which extends radially inwardly toward the outer surface of the shaft 10. This portion 27, as shown, is spaced above the upper surface of the upper bearing 13 and forms an oil seal to prevent lubricating oil from passing into the interior of the motor. A labyrinth seal could be employed if desired.

The lower end of the shaft 10 has a cylindrical sleeve 30 mounted coaxially thereon, including an upper portion 31 of an external diameter approximating the external diameter of the lower end of the shaft 10 and a lower portion 32 of a lesser diameter which extends into the well 14 of the base 11. As shown, the lower end of the portion 32 is spaced from the bottom of the well 14. The lower portion 32 has helical teeth formed on the outer surface thereof, the outer diameter of which is approximately the diameter of the well 14. These teeth function as an oil pump when the shaft rotates.

The base 11 is also provided with a plurality of generally horizontal radially-extending openings 37 which communicate the lower portion of the oil sump 16 with the upper portion of the well 14. Openings 38 located just radially inwardly on the lower race of the bearing 12 communicates the passages 37 with the inner edges of the roller members of the bearing 12.

As shown, the shaft 10 and the sleeve 30 has aligned axial passages 45 and 46 respectively extending through the bottom of the portion 32 to a point in the shaft above the upper surface of the upper bearing 13. The passage 45 at the upper end communicates radially outwardly of the shaft 10 through a plurality of radial openings 47 which, as shown, are located above the upper bearings 13.

Before commencing operation; that is, in the static condition, the lubricating oil 40 is at a level as shown by the line 41. When the shaft 10 commences to rotate, the helical teeth 33 on the outer surface of the portion 32 pump the oil 40 through the passages 37 and downwardly and around the bottom side of the portion 32 and thence vertically upwardly through the passages 45 and 46 to and through the passages 47 where the oil spills onto the upper bearing 13, lubricates it and then flows back into the sump 16.

In addition to this oil flow, the rollers of the lower bearing 12 move rapidly about the axis of rotation, churning the oil up in the bearing and, because of the high circumferential velocity, sling it radially outwardly from the bearing between the upper and lower bearing races at a high velocity as shown by the dotted lines 50 of Figures 1 and 2.

In accordance with the invention, cooling means are provided above the oil level 43 and in this discharge path 50 to cool the oil as it is discharged from the lower bearing 12 and to employ the impact of the discharge of the oil on the cooling means to continually break away any oil which tends to congeal on the cooling surfaces so that the maximum cooling effect can be obtained with a minimum area of cooling surface. The cooling means in the embodiment shown comprises a toroidal coil of copper tubing 51 having ends 52, 53 which pass outwardly through the circular flange 15 and communicate with a source of a cooling medium, such as water, not shown. The coil 51, as shown, completely surrounds the lower bearing 12 so that all oil discharged from the bearing will impinge thereon to be cooled thereby.

Obviously, other forms of cooling means could be employed such as helical coils of copper tubing, finned tubes or, if desired, the circular flange may be hollow and cooling water may be circulated therethrough. In this event, however, it would be preferred that the inner circumferential surface of the flange 15 be finned or the like.

The embodiment shown in the drawing and described above has proven to be extremely practicable in actual operation. When the coil was submerged below the level of the cooling oil, as heretofore done, it was impossible to obtain the desired and necessary degree of cooling of the oil. The oil appeared to congeal on the surfaces of the coil and acted as an insulating blanket, preventing the outer hot oil from coming into thermal contact with the cooling surfaces of the coil itself. However, when the identical coil was raised to a point above the level of the cooling oil in the sump and in the discharge path 50, an immediate and very marked increase in the cooling rate occurred such that expensive redesign of the entire lower end of the equipment was no longer considered necessary.

Obviously, other arrangements and combination of parts differing radically from those described in the above specification and illustrated in the drawing will occur to others upon a reading and understanding of this specification, and it is my intention to include all such alterations insofar as they come within the scope of the appended claims which, as heretofore stated, specifically set forth and define the invention.

Having thus described my invention, I claim:

1. In rotating equipment, a shaft having a vertical axis of rotation, an oil sump surrounding said shaft and having a normal operating oil level, slinger means mounted on said shaft and rotating therewith for slinging lubricating oil supplied from said sump radially outwardly at high velocity when said shaft is rotating and water-cooled cooling means at least in part above said oil level and in the direct path of discharge from said slinger means for cooling said oil.

2. In rotating equipment, a shaft having a vertical axis of rotation, a bearing member for supporting said shaft, an oil sump surrounding said bearing member, means for pumping oil through said bearing, said bearing being of the type to sling the lubricant supplied thereto radially outwardly at a high velocity when said shaft is rotating and cooling means including a water-cooled coil at least in part above the level in said sump and in the direct discharge path of said bearing member for cooling said oil as it is discharged from the bearing member.

3. In apparatus of the type described, a vertical shaft having a vertical axis of rotation, a bearing member for supporting said shaft of the type requiring a continuous supply of fresh lubricant, means for continuously supplying fresh lubricant to said bearing member, means for slinging the lubricant discharged from said bearing radially outwardly at a high velocity, an oil sump having an oil level below said slinging means and oil-cooler means including a coil at least in part above the oil level of said sump and in the direct discharge path of the oil from said slinging means.

4. In apparatus of the type described, a base, a shaft having a vertical axis of rotation and a bearing member for supporting said shaft for rotation on said base, said base having a member forming an oil sump about said bearing member, means for maintaining the level of lubricant in said sump below at least in part the level of said bearing member, means for supplying a continuous supply of lubricant to said bearing member, said bearing member being constructed to sling the discharge oil therefrom radially outwardly at a high speed in a plane above the level of oil in said sump and cooling means in the direct discharge stream of oil from said bearing member positioned above the level of the oil in said sump.

5. The combination of claim 4 wherein said cooling means is in the form of a toroidal coil having its principal plane in the plane of said discharge stream and means for flowing a cooling medium through said toroidal coil.

6. The combination of claim 4 wherein said lubricant is of a type and viscosity such as to congeal on said cooling means if cooled to the approximate temperature of said cooling means.

References Cited in the file of this patent

UNITED STATES PATENTS

| Number | Name | Date |
|---|---|---|
| 1,323,769 | Jacobson | Dec. 2, 1919 |
| 1,610,886 | Ross | Dec. 14, 1926 |
| 1,987,937 | Howarth | Jan. 15, 1935 |
| 2,568,861 | Luenberger | Sept. 25, 1951 |